United States Patent [19]

Moreth

[11] Patent Number: 5,799,569
[45] Date of Patent: Sep. 1, 1998

[54] ROASTING OVEN SPIT AND MOUNTING STRUCTURE

[76] Inventor: R. Edward Moreth, 3000 Seaview Pl., Ft. Lauderdale, Fla. 33305

[21] Appl. No.: 659,005

[22] Filed: Jun. 4, 1996

[51] Int. Cl.⁶ .................................................. A47J 37/04
[52] U.S. Cl. .................. 99/421 H; 99/419; 99/421 P; 99/446; 99/482
[58] Field of Search ................ 99/339, 340, 419–421 P, 99/444–447, 448, 421 V, 450, 482, 421 TP; 126/25 R, 9 R

[56] References Cited

U.S. PATENT DOCUMENTS

| | | | |
|---|---|---|---|
| 1,263,331 | 4/1918 | Lindroth | 99/446 |
| 2,618,730 | 11/1952 | Panken | 99/421 H |
| 2,696,163 | 12/1954 | Galley | 99/421 H |
| 2,762,293 | 9/1956 | Boyajian | 99/421 P |
| 2,885,950 | 5/1959 | Stoll et al. | 99/421 H |
| 3,104,605 | 9/1963 | McKinney | 99/421 H |
| 3,125,015 | 3/1964 | Schlaegel | 99/421 P |
| 3,196,776 | 7/1965 | Norton | 99/421 P |
| 3,205,812 | 9/1965 | Booth | 99/421 P |
| 3,296,957 | 1/1967 | Gagnon et al. | 99/444 |
| 3,333,529 | 8/1967 | Wilson | 99/421 P |
| 3,832,989 | 9/1974 | Belford | 126/25 R |
| 4,214,516 | 7/1980 | Friedl et al. | 99/447 |
| 5,184,540 | 2/1993 | Riccio | 99/421 |
| 5,361,685 | 11/1994 | Riccio | 99/421 |
| 5,373,778 | 12/1994 | Moreth | 99/421 |

*Primary Examiner*—Timothy F. Simone
*Attorney, Agent, or Firm*—Frank L. Kubler

[57] ABSTRACT

A spit assembly for a roasting oven includes an oven housing for receiving food items and retaining heat; a heating element mounted to radiate heat within the housing; a first spit mounting plate; a second spit mounting plate substantially parallel to and spaced apart from the first spit mounting plate; a spit assembly shaft extending through and attached to the first and second mounting plates and rotatably mounted within the housing; a drive mechanism for rotating the spit assembly shaft; in which the first spit mounting plate comprises at least one first spit mounting port spaced radially outward from the spit assembly shaft, the first spit mounting port having a star shape including a substantially circular port middle portion and nine equally spaced apart, elongate port finger portions opening and extending radially from the port middle portion; a spit including a first spit end sized for insertion into the first mounting port and configured in cross-section to include three radial flanges, substantially 120 degrees apart and of substantially equal radial length, the flanges being sized relative to the finger portions such that the spit first end fits into the first mounting port in either of two ways, one way causing the spit to remain rotationally fixed with respect to the assembly and the other way causing the spit to rotate relative to the assembly as the assembly rotates.

12 Claims, 5 Drawing Sheets

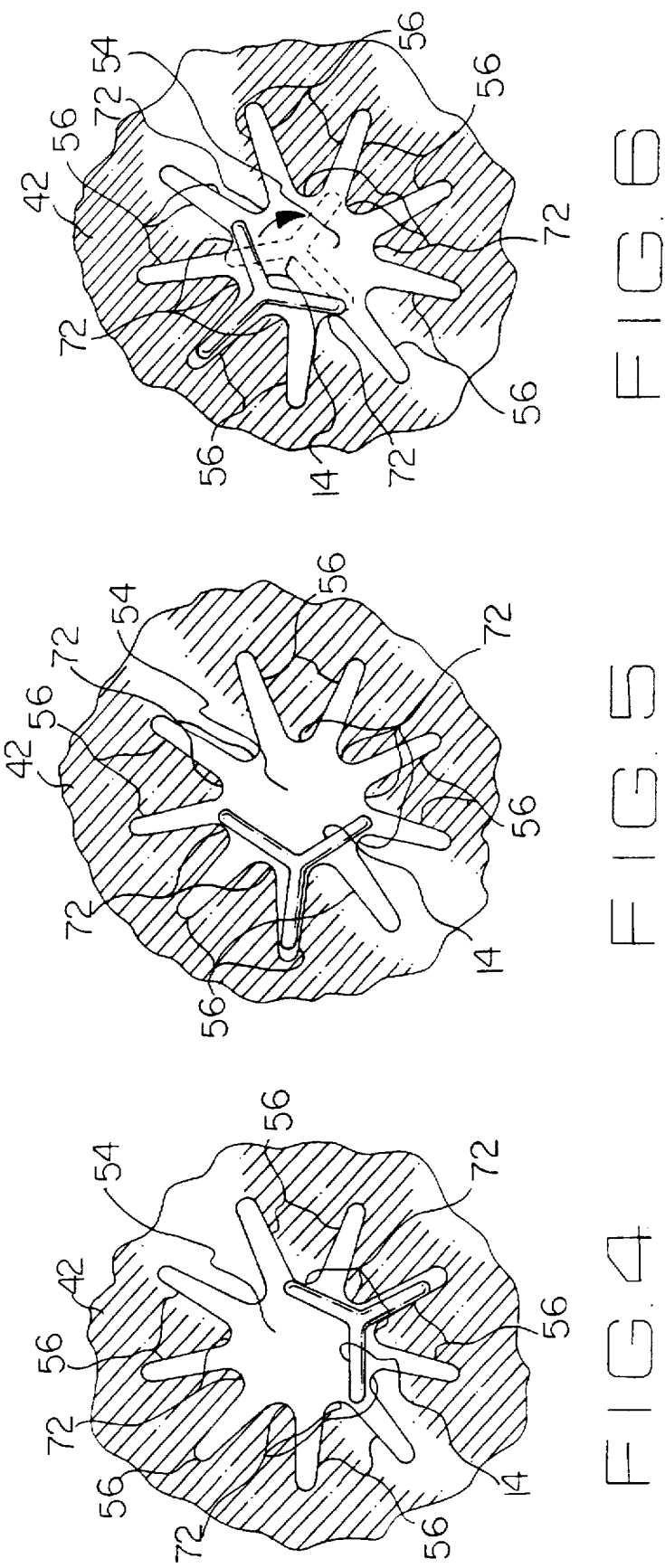

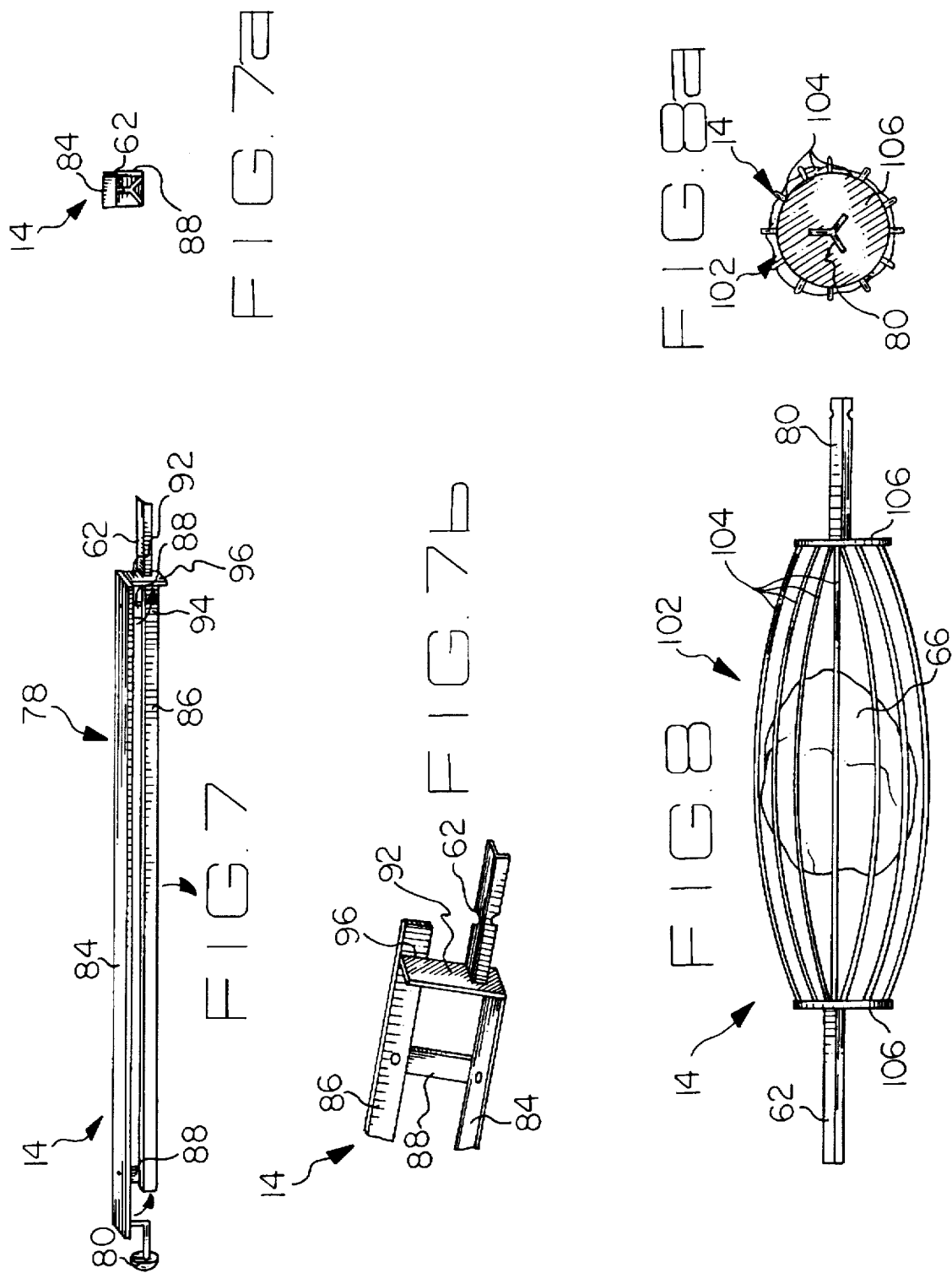

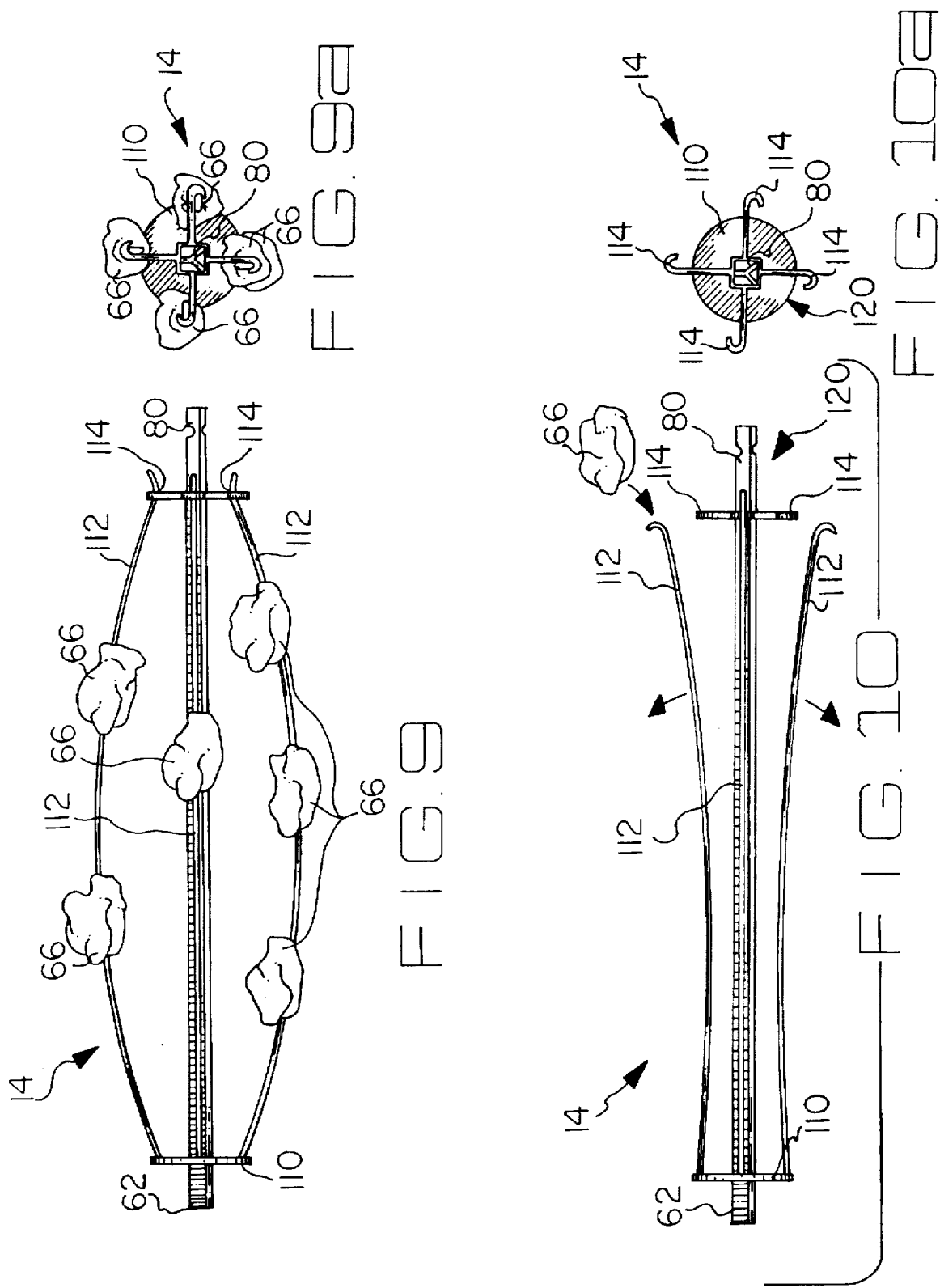

ROASTING OVEN SPIT AND MOUNTING STRUCTURE

BACKGROUND OF THE INVENTION

1. Field of the Invention

The present invention relates generally to the field of roasting ovens containing spits mounted within rotating spit assemblies. More specifically the present invention relates to a spit and a rotating spit assembly, at least one spit end and the mounting port having a geometrical relationship such that they fit together in either of two ways to operate in two different modes. The spit is mounted quickly and without tools, by inserting one spit end into one mounting port, swinging the other spit end into alignment with the opposing mounting port and sliding the spit axially into the opposing mounting port, so that both spit ends rest within opposing ports. Inserting the spit end into the mounting port one way causes the spit to rotate relative to the spit assembly in discrete steps by the action of gravity on the spit as the assembly rotates. Inserting the spit end a second way causes the spit to remain substantially fixed with respect to the spit assembly as the assembly rotates. The spit is removed without tools, simply by sliding the spit axially relative to the spit assembly to free one spit end and then lifting the spit out of the assembly. One embodiment of the spit includes an expansion assembly which opens to engage food items impaled on the spit during cooking and closes to release the food items for removal.

2. Description of the Prior Art

There have long been rotating spit assemblies in roasting ovens for passing through and supporting food items as the items are cooked. Some of these prior spit assemblies permit mounting of spits either to remain fixed with respect to the rotating spit assembly or to rotate relative to the spit assembly as the assembly itself rotates within the oven. A problem with these prior spit assemblies has been that the spits are often designed to engage a gear train in the assembly, and tools and time consuming labor are required to remove and replace the spits.

U.S. Pat. No. 5,361,685, issued to Riccio on Nov. 8, 1994 and U.S. Pat. No. 5,184,540 also issued to Riccio on Feb. 9, 1993, both teach a spit with radial flanges at a spit drive end. The radial flanges are each engaged by spit port shoulder portions of a drive device. A problem with Riccio is that the disclosed four-point shoulder portion spit port permits the spit to rotationally slip backward when it reaches the top of the port. Another problem is that there is no provision for rotationally fixing the spit respect to the port.

It is thus an object of the present invention to provide a spit assembly which permits rapid removal and replacement of spits without tools and without periodic maintenance of gears.

It is another object of the present invention to provide such an assembly which provides a choice of two modes of spit rotation, one being rotation relative to the spit assembly and the other being no rotation relative to the spit assembly.

It is another object of the present invention to provide such an assembly with a spit which expands to engage a food item firmly during cooking and which contracts to release the food item for removal from the spit.

It is still another object of the present invention to provide such an assembly with a food item retaining cage portion for receiving and retaining food items during cooking.

It is a further object of the present invention to provide such an assembly with several tines for retaining small food items.

It is finally an object of the present invention to provide such an assembly which is relatively inexpensive to manufacture, which requires virtually no training to operate, and which requires minimal maintenance.

SUMMARY OF THE INVENTION

The present invention accomplishes the above-stated objectives, as well as others, as may be determined by a fair reading and interpretation of the entire specification.

A spit assembly is provided for a roasting oven, including an oven housing for receiving food items and retaining heat; a heating element mounted to radiate heat within the housing; a first spit mounting plate; a second spit mounting plate substantially parallel to and spaced apart from the first spit mounting plate; a spit assembly shaft extending through and attached to the first and second mounting plates and rotatably mounted within the housing; a drive mechanism for rotating the spit assembly shaft; in which the first spit mounting plate comprises at least one first spit mounting port spaced radially outward from the spit assembly shaft, the first spit mounting port having a star shape including a substantially circular port middle portion and nine equally spaced apart, elongate port finger portions opening and extending radially from the port middle portion; a spit including a first spit end sized for insertion into the first mounting port and configured in cross-section to include three radial flanges, substantially 120 degrees apart and of substantially equal radial length, the flanges being sized relative to the finger portions such that the spit first end fits into the first mounting port in either of two ways, a first way being where the three flanges enter every third finger portion to lock the spit against rotation relative to the first mounting port and a second way where one the flange slides completely into one the finger portion and then slides out of the finger portion as the first mounting port rotates such that the first spit end rotates within the first mounting port until another the flange enters another the finger portion, in a repeating cycle.

BRIEF DESCRIPTION OF THE DRAWINGS

Various other objects, advantages, and features of the invention will become apparent to those skilled in the art from the following discussion taken in conjunction with the following drawings, in which:

FIGS. 4–6 are views as in FIG. 3, in which the spit is inserted in the position for spit rotation relative to the first mounting port and the spit assembly, showing the behavior of the spit within the port as the port rotates. In FIG. 6 the spit is shown rotating and falling within the port in one of a sequence of discrete spit rotational steps.

FIG. 7 is a side view of the second preferred embodiment of the spit, including the optional lateral expanding assembly for engaging food items mounted on the spit. FIG. 7a is an end view of the expanded spit. This spit has the three radial flanges diverging from one spit end to operate in the alternative rotational and fixed modes. FIG. 7b is a close-up, broken away, inverted view of the latching plate and latching portion notch or groove engagement structure at one spit end.

FIG. 8 is a side view of the third preferred embodiment of the spit, having a thin wire cage for retaining food items during cooking. The wires are manually pulled apart to insert or remove a food item, and the resilience of the wires causes them to return to their equally spaced cage forming position. FIG. 8a is an end view of this spit. Once again, this spit has the three radial flanges diverging from one spit end to operate in the alternative rotational and fixed modes.

FIG. 9 is a side view of the forth preferred embodiment of the spit, having a disk mounted toward one spit end from which several resilient tines extend longitudinally along the spit. Small food items are impaled on each of the tines, and then each tine is deflected laterally by hand and hooked into a tine retaining hook assembly toward the other end of the spit to hold the food items on the spit during cooking. FIG. 9a is an end view of this spit with the tines engaged by the hook assembly. Still again, this spit has the three radial flanges diverging from one spit end to operate in the two alternative modes.

FIG. 10 shows the forth preferred embodiment of the spit with the tines unhooked from the hook assembly so that food items can be slid onto or slid off the tines. FIG. 10a is an end view of the spit with the tines disengaged.

DETAILED DESCRIPTION OF THE PREFERRED EMBODIMENTS

Figure 1:
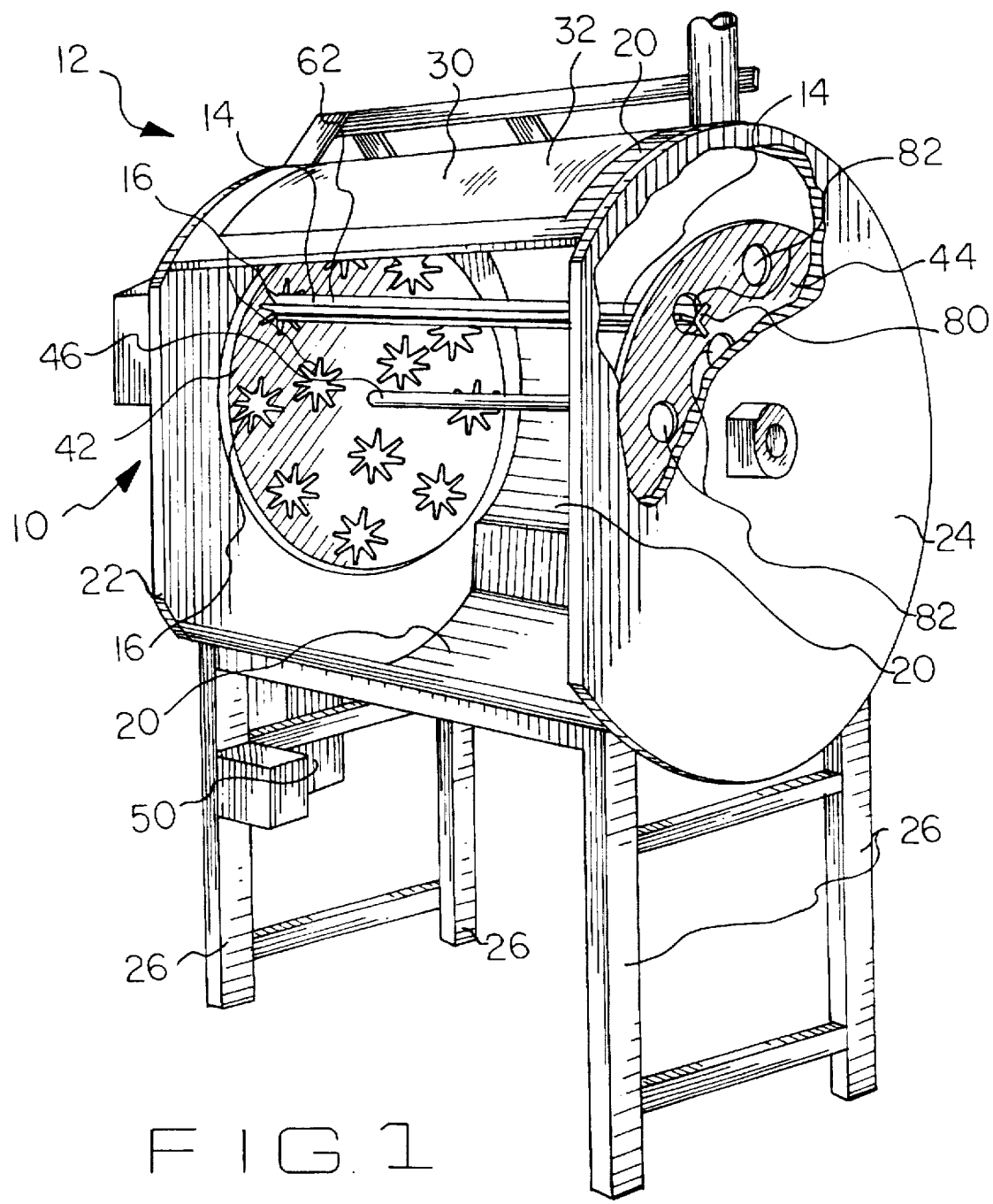
FIG. 1 is a perspective view of a roasting oven equipped with the inventive spit assembly of the first preferred embodiment.
Figure 2:
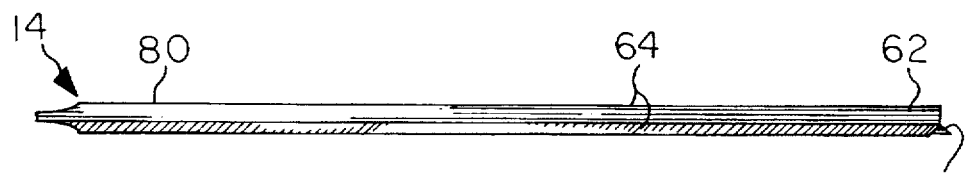
FIG. 2 is a side view of the first preferred embodiment of a spit for the assembly.
Figure 2A:
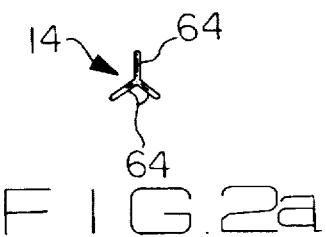
FIG. 2a is an end view of the spit of FIG. 2.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–6, a spit assembly 10 for a roasting oven 12 is disclosed. Several spits 14 are provided which each fit into opposing first and second spit mounting ports 16 in spit assembly 10, each spit 14 and first spit mounting port 16 being configured such that they fit together in either of two ways to operate in two different modes.

Roasting oven 12 is of the general type disclosed in U.S. Pat. No. 5,373,778, issued to the present applicant on Dec. 20, 1994, the contents of which are incorporated by reference into the present application. The oven 12 generally includes a tubular side wall 20, a first end wall 22 and a second end wall 24, legs 26 welded to tubular side wall 20, and infrared heat sources 30 fitted into elongate heat source ports 32 in the upper portion of side wall 20. See FIG. 1.

Spit assembly 10 includes substantially parallel and spaced apart first and second spit mounting plates 42 and 44, respectively, secured to a rotating shaft 46 which is rotatably mounted within shaft bearings (not shown) in first and second oven end walls 22 and 24. Rotating shaft 46 is connected to a shaft drive motor 50 such as with a drive chain (not shown). First and second spit mounting plates 42 and 44 are preferably steel disks. First spit mounting plate 42 includes a peripheral series of first spit mounting ports 16. Each first spit mounting port 16 has a nine point star shape made up of a port middle portion 54 which is essentially circular and nine equally spaced apart, elongate port finger portions 56 extending radially from port middle portion 54.

A first end 62 of each spit 14 is sized for insertion into one of the first spit mounting ports 16. See FIG. 2. Each spit first end 62 including three flanges 64 which diverge radially from the longitudinal spit axis. Flanges 64 are substantially 120 degrees apart and of substantially equal radial length, such that flanges 64, when viewed in cross-section, have end points which define an equilateral triangle. The width of each flange 64 is less than the width of each finger portion 56 for sufficient loose play between flanges 64 and finger portions 56 to permit the spit rotational mode of operation as set forth in the following paragraphs. Spits 14 are of extruded, unibody construction.

Figure 3:
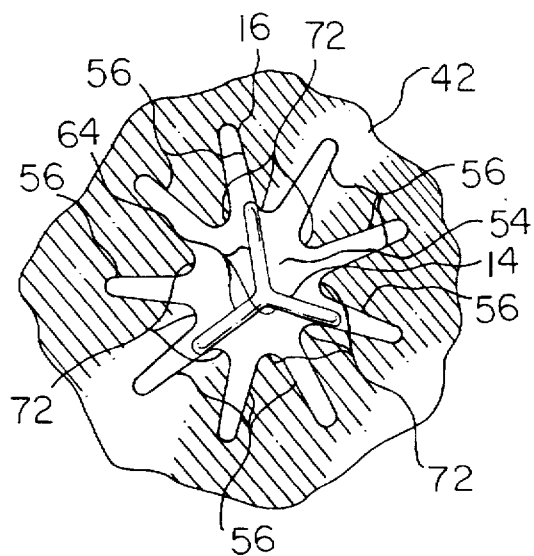
FIG. 3 is a front view of a first spit receiving port and a cross-section of a spit within the port, the spit being in the rotationally locked position.

A spit first end 62 fits into a first spit mounting port 16 in either of two ways. Spit first end 62 may be inserted into the first spit mounting port 16 such that the three flanges 64 partly enter every third finger portion 56, as shown in FIG. 3. This mounting substantially locks the spit 14 against rotation relative to the first spit mounting port 16, and the spit first end 62 cannot slip out of this locked position. None of the flanges 64 can slide out of the port finger portion 56 into which it extends because the other two flanges 64 stop spit 14 lateral movement within port 16 by abutting the sides of their respective finger portions 56.

A first spit end 62 may alternatively be inserted into a first spit mounting port 16 such that one flange 64 slides deeply into one of the finger portions 56, until stopped by the lateral abutment of the other two flanges 64 against the two immediately adjacent middle portion 54 wall segments 72. See FIG. 4. When the first spit end 62 is inserted into the first spit mounting port 16 in this way, rotation of the mounting plates 42 and 44, and thus of the first mounting port 16, causes first spit end 62 to ride with the rotating port 16 a certain number of degrees. Then, when the angle of the given finger portion becomes sufficiently steep to overcome starting friction, the first spit end 62 slides within the first mounting port 16 such that the inserted flange 64 slides out of the given finger portion 56. The first spit end 62 pivots on the flange 64 immediately below the exiting flange 64, and the third flange 64 drops into contact with a wall segment 72 of middle portion 54 and then slides into an adjacent finger portion 56. This sliding and dropping of first spit end 62 results in one spit rotational step, as above described. As the first mounting port 16 continues to rotate it swings the newly inserted flange 64 progressively upward until the finger portion 56 becomes sufficiently angled downwardly to permit the spit 14 to once again overcome friction and slide within the port 16. The inserted flange 64 slides out of the given finger portion 56, as the spit end 62 pivots on the flange 64 immediately below the inserted flange 64, and the spit 14 drops down as described above to begin the cycle again. See FIG. 6. This construction causes the spit 14 to advance to the next most distant finger portion 6 each time they rotate to very evenly cook the food items 66 on the spit 14.

The provision of a first spit end 62 formed of three radial flanges and of a first spit mounting port 16 having nine finger portions 56 is not arbitrary. Spit ends having more radial flanges, and mounting ports having either more or fewer finger portions, would in some cases permit the step rotational advance of the spit within the port. Yet the specific three flange and nine finger portion configuration is necessary to present properly aligned finger portions 56 to receive each flange 64, to simultaneously receive flange 64 and substantially lock the spit 14 against rotation within the port 16, and provide, with no change in dimensions, sufficient clearance within the port middle portion 54 for the step rotation action. It is noted that some spits 14 in the oven 12 can be in the rotating mode while at the same time other spits 14 in the oven 12 can be in the fixed mode.

Figure 2B:
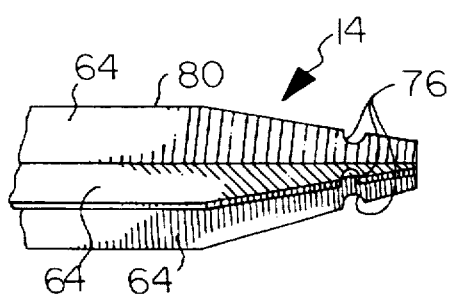
FIG. 2b is a close-up, broken-away perspective view of the spit tapered end showing the port edge engaging notches.

Second spit mounting plate 44 includes a peripheral series of second spit mounting ports 82, which are each preferably circular. Each spit 14 has a spit second end 80 which is inserted into one of mounting ports 82. Flanges 64 at spit second end 80 are preferably tapered to more easily penetrate a food item 66 to mount the food item 66 on the spit 14. See FIGS. 2 and 2b. Notches 76 are provided in the tapered segments of flanges 64 to engage the edge of a mounting port 82 and prevent longitudinal spit 14 sliding. Notches 76 may be squared, rounded or have any other suitable shape. The nine point star shape is not required at the spit second end 80 because the geometric interaction at the spit first end 62 is sufficient to either hold the spit 14 rotationally fixed relative to assembly 10 or to cause spit 14 to rotationally advance in steps.

Second Preferred Embodiment

A second embodiment of spit 14 is provided which includes a spit expansion assembly 78 between ends 62 and 80 to engage a food item 66 impaled on spit 14. See FIG. 7. A middle segment 84 is rigidly connected to ends 62 and 80. An expansion member 86 is pivotally mounted on connecting links 88, and pivots toward and away from middle segment 84 while remaining substantially parallel to middle segment 84. A latch plate 92 is welded to and extends laterally from middle segment 84. A latching portion 94 of expansion member 86 slides against latch plate 92 as expansion member 86 pivots away from middle segment 84 into an open position. A groove or notch 96 is provided in latching portion 94 to resiliently engage an edge of latch plate 92 to hold expansion member 86 in an expanded, open position. To close expansion member 86 against middle segment 84 and release food items 66 on spit 14, the user first applies lateral pressure against latching portion 94 to lift notch 96 off latch plate 92.

Third Preferred Embodiment

FIG. 8 shows a side view of the third preferred embodiment of the spit 14, having a thin wire cage 102 for retaining food items 66 during cooking. The wires 104 of cage 102 extend between cage end disks 106 and are manually pulled apart to insert or remove a food item 66, and the resilience of wires 104 causes wires 104 to return to their equally spaced cage-forming position. FIG. 8a is an end view of this spit 14. Once again, this spit 14 has the three radial flanges 64 diverging from a first spit end 62 to operate in the alternative rotational and fixed modes.

Forth Preferred Embodiment

FIG. 9 shows a side view of the forth preferred embodiment of the spit 14, having a tine disk 110 mounted toward a first spit end 62 from which several resilient tines 112 extend longitudinally along the spit 14. Small food items 66 are impaled on each of tines 112, and then each tine 112 is deflected laterally by hand and hooked into a hook 114 of a tine retaining hook assembly 120 toward the second end 80 of the spit 14 to hold the food items 66 on spit 14 during cooking. FIG. 9a is an end view of this spit 14 with the tines 112 engaged by the hooks 114. Still again, this spit 14 has the three radial flanges 64 diverging from a first spit end 62 to operate in the two alternative modes. FIG. 10 shows this embodiment of spit 14 with the tines 112 unhooked from hook assembly 120 so that food items 66 can be slid onto or slid off tines 112. FIG. 10a is an end view of this spit 14 with the tines 112 disengaged from hooks 114.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A spit and a roasting oven assembly, comprising:
   an oven housing for receiving food items and retaining heat;
   a heating element mounted to radiate heat within said housing;
   a first spit mounting plate;
   a second spit mounting plate substantially parallel to and spaced apart from said first spit mounting plate;
   a spit assembly shaft extending through and attached to said first and second mounting plates and rotatably mounted within said housing;
   drive means for rotating said spit assembly shaft;
   wherein said first spit mounting plate comprises at least one first spit mounting port spaced radially outward from said spit assembly shaft, said first spit mounting port having a star shape including a substantially circular port middle portion and nine equally spaced apart, elongate port finger portions opening and extending radially from said port middle portion;
   a spit including a spit first end sized for insertion into said first spit mounting port and configured in cross-section to include three radial flanges, substantially 120 degrees apart and of substantially equal radial length, said flanges being sized relative to said port finger portions such that said spit first end fits into said first spit mounting port in either of a first and second way, said first way being where said three radial flanges enter every third finger portion to lock said spit against rotation relative to said first spit mounting port and said second way being where one said flange slides completely into an initial said finger portion and then slides out of the initial said finger portion as said first spit mounting port rotates, such that said first spit end rotates within and relative to said first spit mounting port until another said flange enters another said finger portion, in a repeating cycle.

2. The assembly of claim 1, wherein said second spit mounting plate comprises at least one second spit mounting port spaced radially outward from said spit assembly shaft, said second spit mounting port having a substantially circular shape, and wherein said spit comprises a spit second end sized for insertion into said second spit mounting port, such that said spit second end is free to rotate within and relative to said second spit mounting port and to rotate fixedly together with said second spit mounting port, as guided by said spit first end within said first spit mounting port.

3. A spit assembly for a roasting oven comprising an oven housing for receiving food items and retaining heat and a heating element mounted to radiate heat within said housing, comprising:

a first spit mounting plate;

a second spit mounting plate substantially parallel to and spaced apart from said first spit mounting plate;

a spit assembly shaft extending through and attached to said first and second mounting plates and rotatably mounted within said housing;

drive means for rotating said spit assembly shaft;

wherein said first spit mounting plate comprises at least one first spit mounting port spaced radially outward from said spit assembly shaft, said first spit mounting port having a star shape including a substantially circular port middle portion and nine equally spaced apart, elongate port finger portions opening and extending radially from said port middle portion;

a spit including a spit first end sized for insertion into said first spit mounting port and configured in cross-section to include three radial flanges, substantially 120 degrees apart and of substantially equal radial length, said flanges being sized relative to said port finger portions such that said spit first end fits into said first spit mounting port in either of a first and second way, said first way being where said three radial flanges enter every third finger portion to lock said spit against rotation relative to said first spit mounting port and said second way being where one said flange slides completely into an initial one said finger portion and then slides out of the initial said finger portion as said first spit mounting port rotates, such that said first spit end rotates within and relative to said first spit mounting port until another said flange enters another said finger portion, in a repeating cycle.

4. The assembly of claim 3, wherein said second spit mounting plate comprises at least one second spit mounting port spaced radially outward from said spit assembly shaft, said second spit mounting port having a substantially circular shape, and wherein said spit comprises a spit second end sized for insertion into said second spit mounting port, such that said spit second end is free to rotate within and relative to said second spit mounting port and to rotate fixedly together with said second spit mounting port, as guided by said spit first end within said first spit mounting port.

5. A spit assembly for a roasting oven comprising an oven housing for receiving food items and retaining heat and a heating element mounted to radiate heat within said housing, comprising:

spaced apart first and second spit mounting means;

a spit having a first spit end adapted to engage said first spit mounting means and a second spit end adapted to engage said second spit mounting means, and a spit middle segment between said first and second spit ends comprising a first longitudinal member and a second longitudinal member, said first and second longitudinal members being interconnected by linkage means such that said second longitudinal member is pivotable to a food mounting position adjacent to said first longitudinal member and pivotable to a food retaining position spaced apart from said first longitudinal member.

6. The spit assembly of claim 5, additionally comprising second longitudinal member engagement means for securing said second longitudinal member in said food retaining position spaced apart from said first longitudinal member.

7. A spit assembly for a roasting oven comprising an oven housing for receiving food items and retaining heat and a heating element mounted to radiate heat within said housing, comprising:

spaced apart first and second spit mounting means;

a spit having a first spit end adapted to engage said first spit mounting means and a second spit end adapted to engage said second spit mounting means, and a spit middle segment between said first and second spit ends comprising a longitudinal member and a food retaining enclosure surrounding said longitudinal member comprising food passage means for inserting uncooked food into and removing cooked food from within said food retaining enclosure.

8. The spit assembly of claim 7, wherein said food retaining enclosure is a cage comprising a plurality of resilient wire members each having a wire member middle segment and each extending along and bowed radially outwardly from said longitudinal member at said wire member middle segment, and wherein said food passage means comprises two laterally spreadable said wire members having sufficient elastic memory to return to their shapes and positions prior to laterally spreading apart from each other.

9. A spit assembly for a roasting oven comprising an oven housing for receiving food items and retaining heat and a heating element mounted to radiate heat within said housing, comprising:

spaced apart first and second spit mounting means;

a spit having a first spit end adapted to engage said first spit mounting means and a second spit end adapted to engage said second spit mounting means, and a spit middle segment between said first and second spit ends comprising a longitudinal member, a first tine member mounting means secured to said longitudinal member, and at least one food impaling and retaining tine member having a first tine member end connected to said first tine member mounting means and having a second tine member end for impaling a food item for cooking.

10. The spit assembly of claim 9, additionally comprising a second tine member mounting means secured to said longitudinal member and spaced longitudinally apart from said first tine member mounting means, wherein said second tine member end is removably secured to said second tine member mounting means, such that said second tine member end is removed from said second tine member mounting means to receive a food item impaled on said tine member over said second tine member end, and said second tine member end is subsequently secured to said second tine member mounting means to retain said food item on said tine member during food item cooking.

11. The spit assembly of claim 10, wherein said second tine member mounting means comprises a plate member extending radially from said longitudinal member and having a plate member outer edge with at least one tine member end engaging notch, and wherein said wire second end comprises a hook portion for removably engaging said tine member end engaging notch.

12. The spit assembly of claim 10, wherein said tine member has a tine member middle segment between said first and second tine member ends which is bowed relative to said first tine member end and said second tine member end.

* * * * *